(12) United States Patent
Atluri et al.

(10) Patent No.: US 10,189,470 B2
(45) Date of Patent: Jan. 29, 2019

(54) HYBRID VEHICLE PROPULSION SYSTEMS AND METHODS

(71) Applicant: GM GLOBAL TECHNOLOGY OPERATIONS LLC, Detroit, MI (US)

(72) Inventors: Venkata Prasad Atluri, Novi, MI (US); Peter Beller, West Bloomfield, MI (US); Norman K. Bucknor, Troy, MI (US); Tito R. Huffman, Eastpointe, MI (US); Derek F. Lahr, Howell, MI (US); Chunhao J. Lee, Troy, MI (US); Dongxu Li, Troy, MI (US); Chandra S. Namuduri, Troy, MI (US); Thomas W. Nehl, Shelby Township, MI (US); Madhusudan Raghavan, West Bloomfield, MI (US); Alexandru Rajala, Farmington Hills, MI (US); Farzad Samie, Franklin, MI (US); Neeraj S. Shidore, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 92 days.

(21) Appl. No.: 15/239,004

(22) Filed: Aug. 17, 2016

(65) Prior Publication Data
US 2018/0050685 A1 Feb. 22, 2018

(51) Int. Cl.
*B60W 20/40* (2016.01)
*B60W 10/02* (2006.01)
(Continued)

(52) U.S. Cl.
CPC ............ *B60W 20/40* (2013.01); *B60K 6/40* (2013.01); *B60K 6/48* (2013.01); *B60K 6/543* (2013.01);
(Continued)

(58) Field of Classification Search
CPC ............ B60K 6/26; B60K 6/48; B60K 6/543; B60W 10/023; B60W 10/06; B60W 10/08;
(Continued)

(56) References Cited

U.S. PATENT DOCUMENTS 7,944,106 B2   5/2011   Miller et al.
8,469,858 B2   6/2013   Yang et al.
(Continued)

OTHER PUBLICATIONS

Upendra, K. et al., "Analysis of 2014 Formula One Hybrid Powertrain", Swedish Hybrid Vehicle Centre Chalmers University of Technology, Jun. 2014, pp. 1-27.
(Continued)

*Primary Examiner* — Khoi H Tran
*Assistant Examiner* — Robert T Nguyen
(74) *Attorney, Agent, or Firm* — Quinn IP Law (57) ABSTRACT

A vehicle propulsion system includes an engine and a first electric machine each configured to selectively provide torque to propel the vehicle. A second electric machine is coupled to the engine to provide torque to start the engine from an inactive state. A high-voltage power source is configured to power both of the first electric machine and the second electric machine over a high-voltage bus. A propulsion controller is programmed to start the engine using cranking torque output from the second electric machine powered by the high-voltage power source. The controller is also programmed to operate both of the first electric machine and the combustion engine to propel the vehicle in response to an acceleration demand greater than a threshold. The controller is further programmed to decouple the engine and propel the vehicle using the first electric machine in response to vehicle speed less than a speed threshold.

14 Claims, 7 Drawing Sheets

(51) Int. Cl.

| | | |
|---|---|---|
| *B60W 10/06* | (2006.01) | |
| *B60W 10/08* | (2006.01) | |
| *B60W 10/30* | (2006.01) | |
| *B60K 6/48* | (2007.10) | |
| *B60K 6/543* | (2007.10) | |
| *B60K 6/40* | (2007.10) | |
| *B60W 10/04* | (2006.01) | |
| *B60W 20/20* | (2016.01) | |

(52) U.S. Cl.
CPC .......... *B60W 10/02* (2013.01); *B60W 10/023* (2013.01); *B60W 10/026* (2013.01); *B60W 10/04* (2013.01); *B60W 10/06* (2013.01); *B60W 10/08* (2013.01); *B60W 10/30* (2013.01); *B60W 20/20* (2013.01); *B60K 2006/4825* (2013.01); *B60W 2510/244* (2013.01); *B60W 2520/10* (2013.01); *B60W 2540/10* (2013.01); *B60W 2710/024* (2013.01); *B60W 2710/0644* (2013.01); *B60W 2710/081* (2013.01); *B60W 2710/305* (2013.01); *B60Y 2200/92* (2013.01); *B60Y 2300/182* (2013.01); *Y10S 903/93* (2013.01)

(58) Field of Classification Search
CPC ...... B60W 10/30; B60W 20/40; B60W 20/50; B60W 2510/244; B60W 2710/024; B60W 2710/0644; B60W 2710/081; B60W 2720/10; B60Y 2200/92; B60Y 2300/18066; B60Y 2300/18125; B60Y 2300/182; Y10S 903/906; Y10S 903/93; F02N 11/04
See application file for complete search history.

(56) References Cited

U.S. PATENT DOCUMENTS

| | | | | |
|---|---|---|---|---|
| 2010/0107632 | A1* | 5/2010 | Wu | B60W 20/15 60/608 |
| 2010/0191446 | A1* | 7/2010 | McDonald | F02N 11/0837 701/113 |
| 2011/0219746 | A1* | 9/2011 | Yezerets | F01N 3/035 60/274 |
| 2012/0196723 | A1* | 8/2012 | Christen | B60W 30/18018 477/167 |
| 2013/0030634 | A1* | 1/2013 | Endo | B60K 6/46 701/22 |
| 2013/0058795 | A1* | 3/2013 | Cheng | B60H 1/3211 417/44.1 |
| 2013/0296106 | A1* | 11/2013 | Dai | B60K 6/48 477/5 |
| 2014/0067237 | A1* | 3/2014 | Martin | F02D 29/02 701/112 |
| 2014/0149023 | A1* | 5/2014 | Martin | F02P 9/00 701/113 |
| 2014/0195086 | A1* | 7/2014 | Yoshikawa | B60W 20/40 701/22 |
| 2014/0243152 | A1* | 8/2014 | Gibson | B60W 10/06 477/185 |
| 2014/0288748 | A1* | 9/2014 | Ideshio | B60K 6/48 701/22 |
| 2014/0365051 | A1* | 12/2014 | Gussen | F02N 11/0822 701/22 |
| 2015/0038290 | A1* | 2/2015 | Bichler | B60K 6/48 477/5 |
| 2015/0134166 | A1* | 5/2015 | Aoki | B60K 6/445 701/22 |
| 2015/0167614 | A1* | 6/2015 | Malone | F02N 11/0822 701/54 |
| 2015/0239465 | A1* | 8/2015 | Maruyama | B60W 20/20 701/22 |
| 2015/0258881 | A1 | 9/2015 | Holmes et al. | |
| 2016/0101772 | A1* | 4/2016 | Maeda | B60K 6/365 701/22 |
| 2017/0166192 | A1* | 6/2017 | Jeon | B60W 20/30 |
| 2017/0232959 | A1* | 8/2017 | Bureau | B60K 6/48 180/65.28 |
| 2017/0260922 | A1* | 9/2017 | Emig | F02D 41/2441 |
| 2017/0297555 | A1* | 10/2017 | Jeong | B60W 10/06 |
| 2017/0341487 | A1* | 11/2017 | Lee | B60W 10/30 |
| 2017/0355307 | A1* | 12/2017 | Ha | G08G 1/143 |
| 2018/0029439 | A1* | 2/2018 | Jeong | B60W 20/15 |
| 2018/0141536 | A1* | 5/2018 | Naidu | B60K 6/24 |
| 2018/0238291 | A1* | 8/2018 | Kiehn | B60K 6/48 |

OTHER PUBLICATIONS

Morris, G. et al., "A New Engine Boosting Concept With Energy Recuperation for Mico/Mild Hybrid Applications", 22nd International AVL Conference "Engine & Environment", Sep. 9-10, 2010, pp. 1-19.

"User Guide Chevrolet Volt Accessory Power Control Module", General Motors Part Nos. 24262765 and 24261518, 2015, pp. 1-8.

\* cited by examiner

| Propulsion System Operation Mode | | Component State | | | | | | | | |
|---|---|---|---|---|---|---|---|---|---|---|
| | | Clutch 1 | Clutch 2 | Clutch 3 | Batt 1 (HV) | Batt 2 (LV) | APM | SOC1 | SOC2 | Engine State | Traction E/M State |
| Engine Coupled Operating Modes | | | | | | | | | | | |
| 406 — Motor Assist 1 | | Closed | Closed | Closed | Discharge | X | Buck | Mid-Hi | Hi | Fueled | Motoring |
| 408 — Motor Assist 2 (optional Spintrol) | | Closed | Closed | Closed | Discharge | X | Buck | Mid-Hi | Hi | Unfueled | Motoring |
| 410 — Opp. Charging | | Closed | Closed | Closed | Charge | Charge | Buck | Lo-Mid | Lo-Mid | Fueled | Generating |
| 412 — Motor Off | | Closed | Closed | Closed | Trickle Discharge | Trickle Charge | Buck | Mid-Hi | Mid | Fueled | Freewheel |
| 414 — EV Cruising | | Open | Closed | Closed | Discharge | X | Buck | Mid-Hi | Hi | Nil | Motoring |
| 416 — DFCO-Regen | | Closed | Closed | Closed | Charge | Charge | Buck | Lo-Mid | Lo-Mid | Unfueled | Generating |
| 418 — Standstill | | Closed | Open | Open | Charge | Charge | Buck | Lo-Mid | Lo-Mid | Fueled | Generating |
| Engine Decoupled Operating Modes (~0 rpm) | | | | | | | | | | | |
| 420 — EV Cruising | | Open | Closed | Closed | Discharge | X | Buck | Mid-Hi | Hi | Unfueled | Motoring |
| 422 — Regen | | Open | Closed | Closed | Charge | X | Buck | Lo-Mid | Hi | Unfueled | Generating |
| 424 — Coasting | | Open | Open | Open | Trickle Discharge | X | | Mid-Hi | Mid | Unfueled | Freewheel |
| Cranking / Restart Operating Modes | | | | | | | | | | | |
| 426 — Bump Start | | Closed | Closed (clutch control) | Closed | Trickle Charge | X | | Mid-Hi | Mid | Unfueled | Off |
| 428 — LV Battery 2 Start | | Open | Closed | Closed | | Discharge | Boost | NA | | Unfueled | Off |
| 430 — Hv Batt 1 Start Mode | | Open | Closed | Closed | Discharge | X | Buck | Mid-Hi | Hi | Unfueled | Motoring |
| 432 — 48V Battery | | Open | Closed | Closed | Charge | X | Buck | Mid-Hi | Hi | Unfueled | Generating |

HYBRID VEHICLE PROPULSION SYSTEMS AND METHODS

TECHNICAL FIELD

The present disclosure relates to a propulsion system for a hybrid vehicle.

INTRODUCTION

A vehicle can include an internal combustion engine coupled to a transmission and a final drive to transfer torque to road wheels to propel the vehicle. To start the engine of a non-hybrid vehicle, a starter motor can be energized which causes a crankshaft of the engine to turn and begin a combustion cycle. A hybrid electric vehicle may utilize both an electric machine and/or an internal combustion engine to propel the vehicle in order to offer reduced fuel consumption and emissions.

SUMMARY

A hybrid vehicle propulsion system includes an engine and a first electric machine each configured to selectively provide torque to propel the vehicle. The propulsion system also includes a second electric machine coupled to the engine to provide torque to start the engine from an inactive state. A high-voltage power source is configured to power both of the first electric machine and the second electric machine over a high-voltage bus. The propulsion system also includes a plurality of torque disconnect clutches located along a torque flow path to selectively decouple at least one of the engine and the first electric machine according to a vehicle drive mode. The propulsion system further includes a controller programmed to select a first drive mode causing a decoupling of the engine in response to the vehicle being driven at a steady-state speed for a predetermined duration of time. The controller is also programmed to deactivate the engine and propel the vehicle using the first electric machine, and restart the engine using the second electric machine powered by the high-voltage power source.

A method of operating a vehicle propulsion system includes selectively operating a combustion engine to provide a propulsion torque, and operating a first electric machine powered by a high-voltage power source to supplement the propulsion torque. The method also includes decoupling the combustion engine from a driveline in response to the vehicle being operated at a speed or power less than a speed threshold or power threshold, respectively, for a predetermined amount of time. The method further includes restarting the combustion engine using torque output from a second electric machine powered by the high-voltage power source in response to a torque demand that is greater than a torque demand threshold. The method further includes synchronizing a rotational speed of the combustion engine with a propulsion system driveline component prior to coupling the combustion engine to the driveline.

A vehicle propulsion system includes an engine and a first electric machine each configured to selectively provide torque to propel the vehicle. The propulsion system also includes a second electric machine coupled to the engine to provide torque to start the engine from an inactive state. A high-voltage power source is configured to power both of the first electric machine and the second electric machine over a high-voltage bus. The propulsion system further includes a controller programmed to start the engine using cranking torque output from the second electric machine powered by the high-voltage power source. The controller is also programmed to operate both of the first electric machine and the combustion engine to propel the vehicle in response to an acceleration demand greater than an acceleration threshold. The controller is further programmed to decouple the engine and operate the first electric machine to propel the vehicle in response to the vehicle being operated at a speed or power less than a speed threshold or power threshold, respectively.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
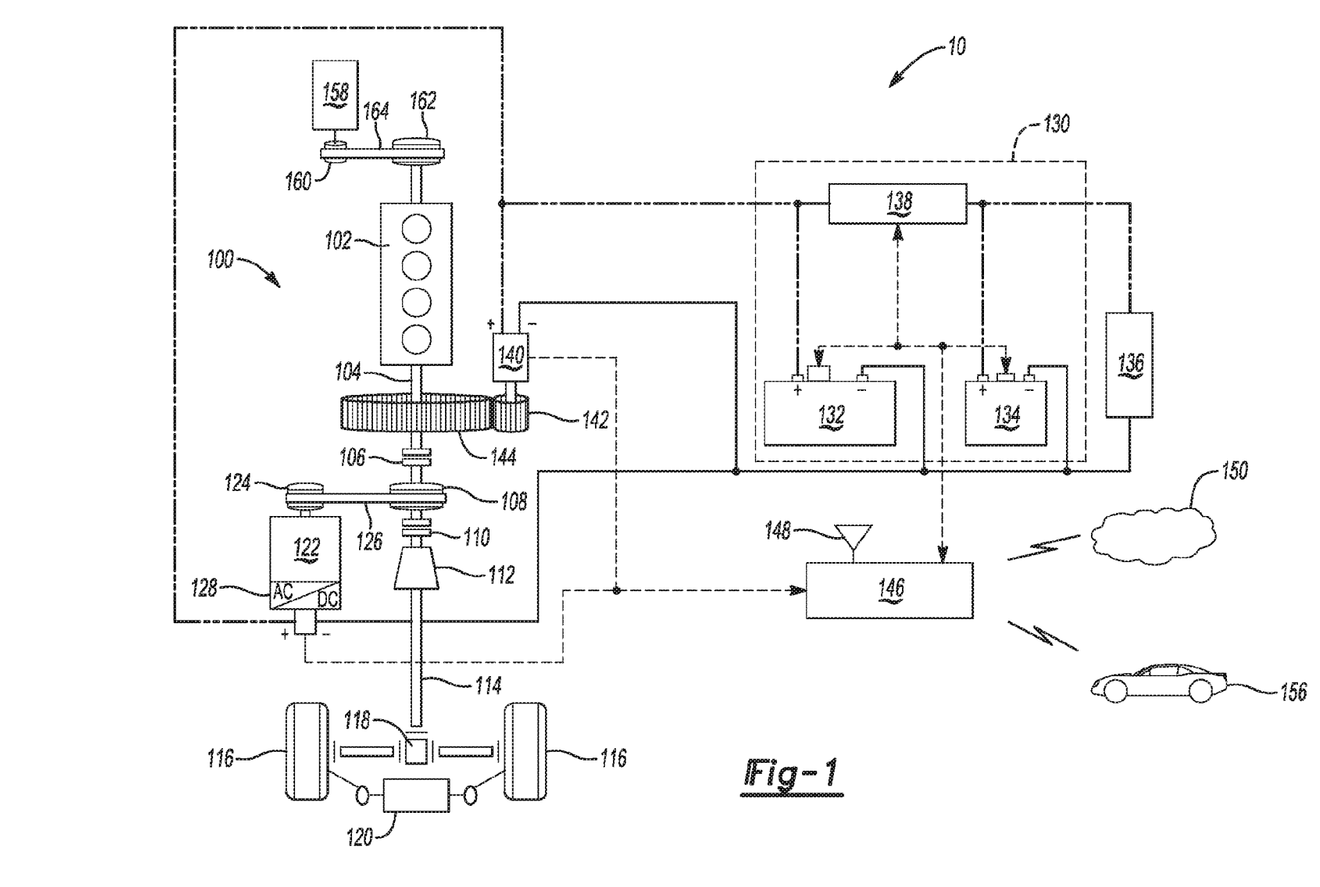
FIG. 1 is a schematic illustration of a hybrid propulsion system.

Referring to FIG. 1, vehicle 10 includes propulsion system 100 having multiple propulsion sources to provide motive power. In various examples, the propulsion system includes internal combustion engine 102 to generate torque at shaft 104 which may be coupled to a crankshaft of the engine. The engine 102 may be a multi-cylinder internal combustion engine that converts fuel to a mechanical torque through a thermodynamic process. Shaft 104 is coupled to an input of a transmission 112 which is configured to provide multiple gear ratios to modify torque and rotational speed to affect drive characteristics. The output of the transmission 112 is then delivered to a final drive output shaft 114 to deliver torque to one or more road wheels 116. The propulsion system may also include a final drive mechanism 118 configured to allocate torque to multiple road wheels 116 from a single torque input. In one example the final drive mechanism 118 is a differential configured to distribute torque to one or more side shafts which are coupled to road wheels 116. The propulsion system may be arranged to deliver torque through any of a front-wheel drive, a rear-wheel drive, or an all-wheel drive configuration.

The engine 102 may be selectively coupled and decoupled from the propulsion system. One or more selectable disconnect elements may be located at various positions along the torque flow path. For example, a first clutch 106 may be provided to selectively engage or disengage the torque output of the engine 102 based on the desired operating mode of the propulsion system 100. In an alternative example, a clutch may be included as a lockup portion of the fluid coupling torque converter. Additionally, any of the clutches described herein may be a selectable state one-way clutch configured to passively engage, for example during overrun conditions, and actively engage to transfer torque in a single direction. Other types of torque transfer mechanisms may be suitable to connect and/or disconnect the engine from the driveline. Discussed in more detail below, the disengaged state of the engine 102 facilitates inactive engine operation modes to enhance fuel efficiency. As used herein, an inactive state of the engine refers to a condition where the engine has substantially zero output torque and zero speed. In contrast, an active state refers to a condition where the engine is rotating.

The propulsion system 100 also includes a second propulsion source such as a traction electric machine 122. In some examples the electric machine may be integrated into a housing of the transmission 112. The traction electric machine 122 exchanges power with a high-voltage battery 132 over a high-voltage bus. The traction electric machine is configured to convert stored electric energy from a battery to mechanical power, and in a reverse direction convert mechanical energy into electrical energy to be stored at the battery. The traction electric machine 122 has multiple operating modes depending on the direction of power flow. For example, the traction electric machine 122 may operate as a traction motor to output torque, operate as a generator to recover energy from rotational motion in the driveline, and also operate in a power-neutral freewheeling state. Additionally, the traction electric machine 122 is configured as an "off-axis" motor-generator, meaning its axis of rotation is separate from the axis of rotation of the input shaft 104 of the transmission. A wider range of torque ratios may be available, and a smaller electric machine may be sufficient to satisfy propulsion demands. Additionally, the traction electric machine may be capable of high speeds of at least two to three times the engine output speed. In other examples, the traction electric machine 122 may be arranged to be "on-axis" such that the axis of rotation of the electric machine is common to the axis of rotation of the transmission input shaft.

In traction motor mode, a power conversion portion 128 operates as an inverter to convert DC power received from one or more energy storage systems into a three-phase AC power to operate the electric machine. In one example, DC power is delivered from a high-voltage battery 132 allowing the traction electric machine 122 to output torque to motor torque interface 124. The power conversion portion also includes a pulse width modulation (PWM) control of one or more internal switches to convert the DC power into AC power in order to generate an electromagnetic field to drive the electric machine. The motor torque interface 124 is coupled to a driveline torque interface 108 via a torque coupling 126. The torque coupling 126 may include a belt to transfer torque between the traction electric machine 122 and other portions of the driveline. In this case, motor torque interface 124 and driveline torque interface 108 may each be provided as pulleys arranged to cooperate with the torque coupling 126. The belt can be a ribbed belt, a flat belt or any other configuration suitable to transfer torque. In some examples, the torque coupling 126 may be provided as a chain instead of a belt, and sprockets can be utilized with the chain as opposed of pulleys. In further examples, the driveline torque interface 108, motor torque interface 124, and the torque coupling 126 may include a plurality of gears to transfer torque from the traction electric machine 122 to the driveline for vehicle propulsion. The traction electric machine may be coupled or connected at various locations along the driveline relative to the torque flow of the propulsion system. The traction electric machine 122 may be disposed either upstream of the transmission 112, downstream of the transmission 112, or integrated within a housing of the transmission 112. In alternative examples, the traction electric machine is integrated into a rear differential of a rear wheel drive configuration.

A second clutch 110 may be arranged to decouple both of the engine 102 and the traction electric machine 122 from the driveline. The engine 102 may still be coupled to the traction electric machine 122 to generate power even when the propulsion sources are not propelling the vehicle.

In generator mode, the direction of torque flow through the torque coupling 126 is reversed and rotational motion in the driveline is used to turn the motor torque interface 124 to generate three phase alternating current. The power conversion portion 128 functions as a power rectifier to convert AC current generated by the traction electric machine 122 into DC current to be received at the high-voltage battery 132. The generated current may be used to recharge the high-voltage battery 132 or supply electrical loads directly.

The high-voltage battery 132 also includes a plurality of sensors to output signals indicative of battery conditions, including but not limited to battery temperature, current transfer at the battery, and battery voltage. Generally, a high-voltage power source is one that has an operating voltage greater than 30 volts but less than 60 volts. In one example, the battery 132 is a lithium ion high-voltage battery with a nominal voltage of about 48 volts. In alternative examples, a 36 volt power source may be provided as the high-voltage power source. Further, other energy storage types may be viable to provide power to the propulsion system as well as other vehicle loads, such as lead acid batteries, super capacitors, or other storage devices.

Low voltage battery 134 supplies power to vehicle loads 136 over a low-voltage bus. Loads 136 may include vehicle accessories and other loads with relatively low electrical demand. For example, the low-voltage battery may have a nominal voltage of about 12 volts and generally less than 18 volts.

A unidirectional or bidirectional DC-DC converter 138 exchanges power between high and low voltage electrical buses. The DC-DC converter 138 may be part of an accessory power control module (APM) and include an internal unidirectional blocking switch or a bidirectional blocking switch. In one configuration, the DC-DC converter 138 includes at least one solid-state switch. The DC-DC converter 138 is configured to allow continuous or selective electrical communication between the high-voltage bus and the low-voltage bus. Therefore, the DC-DC converter 138 can be utilized to ensure that the desired amount of current, within a predetermined voltage range, is delivered to low-voltage loads 136 to power various accessories which can include powering all or some of the accessories of the vehicle 10. The DC-DC converter 138 can be utilized to provide substantially constant voltage to the low-voltage loads 136 if a voltage level of either power source differs from a desired nominal value. In one example, if the voltage level deviates to less than about 10 volts or more than about 16 volts relative to a 12 volt nominal value, the DC-DC converter 138 can regulate the voltage being delivered to the low-voltage load 136. Therefore, the DC-DC converter can increase or decrease the voltage being delivered to power vehicle accessories In another example the DC-DC converter is arranged to convert voltage from about 48 volts to about 12 volts, and vice versa. While the aforementioned voltage values are provided by way of example, it should be appreciated that the present disclosure may be related to power transitions between a range of voltage values for each of a high-voltage bus and a low-voltage bus.

The DC-DC converter 138 may be used in either direction of power exchange such that the high-voltage battery 132 may supply the low-voltage loads 136 without drawing power from the low-voltage battery 134. Additionally, the DC-DC converter 138 may be used to jump start the high-voltage battery 132 using power from the low-voltage battery 134.

In at least one example, each of the power sources, including high-voltage battery 132 and low-voltage battery 134, is integrated into a single power module 130. Additionally, the DC-DC converter 138 may similarly be integrated into the power module 130. In some alternate examples, each of the power sources may have substantially the same voltage. In further alternate examples, power may be provided by a single high-voltage power source. In such examples, the single battery may be jump started from an external power source. The DC-DC converter may be used to step down the voltage to supply low voltage vehicle loads. Further still, certain alternate examples may include a third power source, for example a redundant low-voltage power source.

Vehicle 10 includes a starter electric machine 140 that is selectively coupled to the engine 102. The starter electric machine 140 operates as a starter motor and when engaged with the engine leading up to a combustion cycle, and turns a crank portion of the engine to facilitate a cold start or a restart. The starter electric machine 140 may be selectively coupled to the engine through a geared mechanical connection to pass torque to the crankshaft to start the engine. In one example, a pinion gear 142 cooperates with a ring gear 144 to crank the engine for a start event. The ring gear 144 may be coupled to a flywheel of the engine 102. In another example, the starter electric machine 140 may be connected to a crank pulley through a toothed belt mechanical connection to pass torque to the crankshaft of the engine 102. According to some examples, a controller 146 is programmed to issue a command to start the engine 102 using the starter electric machine 140 in response to an acceleration demand following a period of reduced acceleration demand.

The starter electric machine 140 is selectively engageable to the engine 102 through a sliding pinion gear within a housing of the starter electric machine. A starter actuator (not shown) may be disposed to move the pinion gear 142 between a first disengaged position and a second engaged position that is in mechanical connection with the ring gear 144 to transfer torque. As discussed above there may be different configurations of intermediate components to provide gear ratio adjustments and/or geometric adjustments due to powertrain package constraints. The starter actuator may receive a signal to engage the pinion gear once the starter electric machine is at a suitable speed for smooth torque transfer to start the engine 102.

When the engine is restarted, it may be restarted from substantially zero rotational speed, or from a speed which is significantly less than the rotational speed of the downstream powertrain components such as the traction electric machine 122. The controller 146 may implement a delay following the initial restart of the engine 102 to allow engine speed to ramp up to be within a predetermined range of the system speed prior to engaging the first clutch 106. Reducing the difference between engine speed and speed of the downstream components improves the smoothness of the engagement of the first clutch 106 and reduces noise, vibration, and harshness (NVH) perceived by a passenger related to the engine restart event. However, this delay may lead to a perceivable lag in the delivery of additional propulsion torque required from the engine.

Some powertrain systems may include a brush contact type of starter motor coupled to the engine to provide the startup function. The starter motor is commonly powered by a low-voltage battery connected over a low-voltage bus. It may be powered by low-voltage battery 134 for example, or by a supplemental low-voltage power source.

It may be less than optimal to keep a brushed contact starter motor connected to the power source on an ongoing basis. Therefore brushed contact starter motor systems commonly require a second actuator to selectively make a mechanical connection to an electrical terminal to provide power. When it is desired to start the engine, the starter actuator as well as a secondary actuator must both be energized. In many instances the actuation must be performed sequentially. For example, the secondary actuator may be actuated to provide power to allow the starter motor to build up rotational speed. Then, the starter actuator may be energized to mechanically engage the starter motor output to the engine to facilitate the start event. Such a sequential actuation of multiple solenoids to operate the starter motor may contribute to an undesirable time delay for an engine restart event.

Additionally, a temporary voltage drop may be caused by the power load of the starter motor resulting from an engine start event. A passenger may perceive certain symptoms such as a reduction in lamp illumination levels or temporary degraded function of other electrically-powered accessories due to the voltage drop. To avoid such undesirable symptoms, compensation means may be used but may have disadvantages. For example an additional DC-DC boost converter may be provided to temporarily step increase the voltage to mask potential symptoms related to a voltage drop caused by the starter motor. Alternatively, a supplemental power source may be provided to supplement the low-voltage battery and compensate for a voltage drop. Each of the above examples of a voltage drop compensation means may increase cost, weight, and complexity of the propulsion system.

A brush contact type of motor may also be inherently limited in the time required to start the engine. Related to the construction of the brush contact motor, windings affixed to an internal rotor increase both the size and the mass of the rotor itself. The additional rotational inertia of the rotor may cause a higher duration of time to reach a desired rotational speed from rest. This adds to the duration of the engine restart and subsequently may limit the responsiveness of the propulsion system.

According to aspects of the present disclosure, the starter electric machine 140 is a brushless permanent magnet DC motor selectively coupled to the engine 102 to provide a starting torque to restart the engine 102. The starter electric machine 140 is powered by the high-voltage traction battery 132 over the high-voltage bus. The high-voltage operation of the starter electric machine 140 provides faster engine restarts that enable quicker resumption of engine power delivery during an acceleration event following engine deactivation. For example, conditions including accelerator pedal tip-in causing a rapid torque demand following a coasting period where the engine was deactivated may benefit from aspects of present disclosure.

Powering the starter electric machine 140 over the high-voltage bus eliminates the need for an additional boost converter to stabilize the voltage in the circuit due to power draw. The starter electric machine is powered by the same power source as the traction electric machine 122. Utilizing a high-voltage power source also avoids the need for a supplemental power source to mitigate voltage drops caused by starter operation. Further, by powering the starter electric machine over the separate high-voltage bus, electrical isolation may be achieved between the engine starting function and other vehicle accessory functions.

The brushless electric machine may be any of a number of known motor types such as a surface permanent magnet machine, an internal permanent magnet machine, a drag-cup induction machine, or a switched reluctance machine for example. Brushless motors provide the additional benefit of increased duration of usable life due to the elimination of physical wear from contact of brushes at the commutator. Further, an electronically commutated electric machine may be capable of more precise control of motor speed as compared to a brushed motor. In some examples, the starter electric machine may be operated using a field weakening control strategy to further improve control of the power output. According to aspects of the present disclosure, the output speed of the second electric machine is synchronized with the speed of the engine to reduce NVH which may occur during a driver change-of-mind restart event.

The brushless electric machine 140 may also include at least one integrated circuit which is programmed with control logic to perform electronic commutation as opposed to physical contacts employed by a brush motor. The electronic commutation may be achieved by a plurality of solid-state switches (e.g., MOSFET, IGBT type transistors) included within a housing of the electric machine. The switches are independently and selectively connectable to the high-voltage power source. Multiple stages of a commutation sequence are achieved by activating the switches in a sequence to create a rotating magnetic field within the electric machine. Based on selection of particular switches and the rate of actuation, the speed and the output torque of the motor may be precisely controlled. In this way, a separate inverter may not be required to convert direct current from the high-voltage battery 132 into three-phase alternating current to drive the starter electric machine 140. The starter electric machine 140 may also include internal sensors (e.g., Hall effect sensors) to detect the position and speed of the motor. This position feedback may be used to input the control logic to influence the actuation of the solid-state switches. The integrated circuit performs electronic commutation of the solid-state switches in conjunction with the rotor position sensors to convert direct current from the high-voltage power source into alternating current to drive the brushless permanent magnet motor. The control logic may also include protection against undesirable motor conditions such as overcurrent, short-circuit, and thermal overheating. The integrated circuit may be additionally programmed to execute a control action in response to detection of one or more error conditions of the motor.

The integrated circuit as discussed above may eliminate the need for a dedicated actuator to engage and disengage the electrical connection between the starter electric machine and the high-voltage battery 132. The internal solid-state switches may be used to electrically isolate the starter electric machine from the power source without an additional mechanical actuator. According to aspects of the present disclosure, the starter electric machine is provided with a single solenoid actuator to selectively couple the starter electric machine to the engine, and is connected to the high-voltage battery via the solid-state switches.

By using a brushless electric machine the inertia of the rotor may be significantly reduced. The windings are located on the stator thereby reducing the mass of the rotor. For example, a center portion of the rotor may be configured to be hollow to provide mass reduction. Further, permanent magnets of the rotor may be inset relative to an outer surface of the rotor to position the magnets closer to the axis of rotation of the rotor. Comparatively, brushed motor rotors are generally heavier and have a larger diameter relative to a brushless configuration. In a similar engine starter application using a brushed motor, the rotor inertia may be as much as five times greater. The combination of the reduced inertia of the electric machine and high power output over a high speed range (e.g., 5,000-16,000 RPM) enables a faster wind up of the electric machine, and thus a more rapid engine restart.

The starter electric machine 140 may also be powered over the low-voltage bus. For example, in the case of a fault with a portion of the high-voltage power storage system, the engine 102 may still be started in order to propel the vehicle using engine-only propulsion. While full power from multiple propulsion sources may be unavailable, reduced operation from a single propulsion source may avoid a stranded vehicle situation. In another example, extreme low temperature start events may be powered by the low-voltage battery (e.g., a lead acid battery) having better low temperature performance. More specifically, at temperatures below about −30 C, the low-voltage battery may be used to power the starter electric machine until the high-voltage battery has warmed to a higher, natural operating temperature. In these cases, the starter electric machine 140 may be energized using current supplied from the low-voltage battery 134 via 138 in boost mode.

In further examples, the starter electric machine 140 is provided with a two-speed drive mechanism to enable different modes of operation. For example, the engine start operation discussed above may correspond to a first speed. The starter motor may also be capable of providing supplemental torque to the engine even when running at higher speeds. This may be beneficial in the case of a fault with the traction electric machine 122. In such a case the starter electric machine 140 provides redundant power by operating at a second speed and contributes to operation of the propulsion system in a "limp home" reduced functionality mode.

An electric power steering (EPS) system 120 may provide a power assist to changes in the angle of wheels 116 in response to driver actuation of a steering wheel. In one alternative example discussed in more detail below, the EPS system may be controlled by a controller in an autonomous self-driving vehicle mode. The EPS system may be powered by at least one of the high-voltage battery 132 and the low-voltage battery 134.

The propulsion system 100 also includes a front end accessory drive (FEAD) system 158 operated from an output portion of the engine 102. The FEAD includes a FEAD torque interface 160 which is coupled to an engine output torque interface 162. In one example the torque interface 160 and the engine output torque interface 162 are each pulleys that are coupled by a belt 164. Engine ancillary devices, such as a water pump and/or an HVAC system may be driven by the FEAD.

The various propulsion system components discussed herein may have one or more associated controllers to control and monitor operation. Controller 146, although schematically depicted as a single controller, may be implemented as one controller, or as system of controllers in cooperation to collectively manage the propulsion system. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 146 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 146 may also store a number of algorithms or computer executable instructions needed to issue commands to perform actions according to the present disclosure.

The controller 146 is programmed to monitor and coordinate operation of the various propulsion system components. The controller 146 is in communication with the engine 102 and receives signals indicative of at least engine rotational speed, temperature, as well as other engine operating conditions. The controller 146 is also in communication with the traction electric machine 122 and receives signals indicative of motor speed, torque, temperature, current draw, and voltage across the motor. The controller may also be in communication with both of the high-voltage battery 132 and the low-voltage battery 134 and receive signals indicative of at least battery state of charge (SOC), temperature, voltage and current draw. SOC represents the remaining charge available in a battery and is characterized as a percentage of a full charge (i.e., 100%). The controller also receives signals indicative of the circuit voltage at various points across the high-voltage bus and the low-voltage bus. The controller 146 may further be in communication with one or more sensors at driver input pedals (not shown) to receive signals indicative of pedal position which may reflect both positive and negative acceleration demand provided by the driver. The driver input pedals may include an accelerator pedal and/or a brake pedal. In certain alternative examples, such as a self-driving autonomous vehicle, acceleration demand may be determined by a computer that is either on-board or off-board of the vehicle without driver interaction.

The controller 146 may also be capable of wireless communication using transceiver 148. The transceiver may be configured to exchange signals with a number of off-board components or systems. The controller 146 is programmed to exchange information using a wireless communications network 150. Data may be exchanged with a remote server 152 which operates to reduce on-board data processing and data storage requirements. In at least one example, the server 152 performs processing related to propulsion system diagnosis and prognosis. Ongoing system performance data is uploaded and stored at the server 152. The server may store one or more model-based computation algorithms to perform state of health analysis for various propulsion sub-systems including at least the traction electric machine, the starter electric machine, and the energy storage system. Vehicle analytics performed at the off-board server 152 allows warning messages to be relayed back to inform a vehicle user of a component state of health. Further, revised operational instructions may be provided to the controller based on the vehicle analytics. For example, the frequency of engine deactivation events may be reduced in response to a degraded state of health of the starter electric machine. In some examples, at least a portion of the model-based algorithms is stored in a memory at the controller 146.

The controller 146 may further be in communication with a cellular network 154 or satellite to obtain a global positioning system (GPS) location. Additionally real-time information such as traffic flow and weather may similarly be conveyed to the controller over the wireless communications network 150. Upcoming engine deactivation and/or re-activation may be predetermined based on geographic location information such as speed limits or local traffic flow.

The controller 146 may also be in direct wireless communication with objects in a vicinity of the host vehicle. For example, the controller may exchange signals with one or more vehicles 156 to exchange information regarding the relative proximity of the vehicles with respect to one another. Such information may be used to predict imminent deceleration and/or acceleration of the vehicle based on the movement of nearby objects. More specifically, an upcoming engine deactivation event may be predicted based on an upcoming accelerator tip-out related to traffic or other nearby vehicles decelerating. Similarly, an imminent engine restart may be predicted based on an upcoming increase in vehicle speed (i.e., increased torque demand) related to improved traffic flow. In a further example, the proximity and/or movement of external objects may facilitate autonomous driving features such as automatic self-parking.

Figure 2:
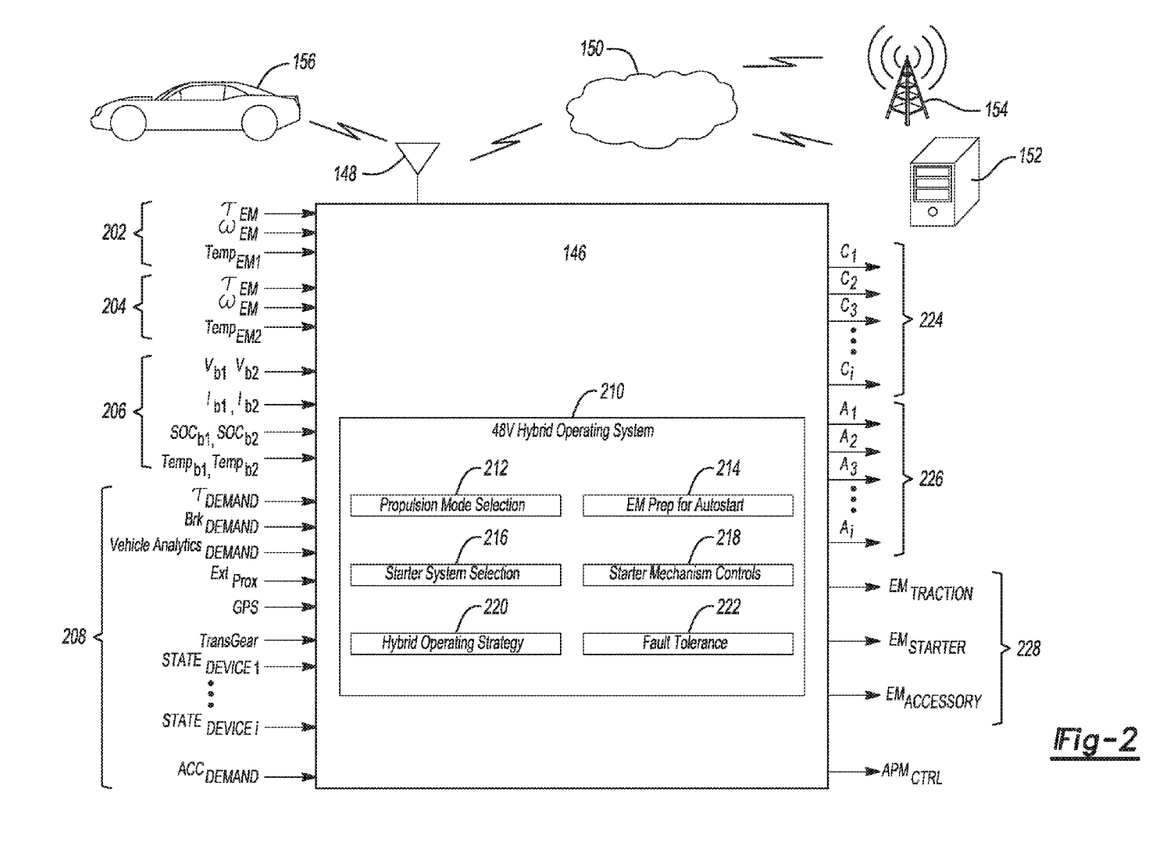
FIG. 2 is a system diagram of a propulsion system controller.

With specific reference to FIG. 2, a system diagram of controller 146 depicts several input and output signals related to operation of the propulsion system. In one example the controller 146 is configured to receive a plurality of input signals 202 from the traction electric machine, such as of at least a traction electric machine torque signal, $\tau_{EM1}$, a traction electric machine speed signal, $\omega_{EM1}$, and a traction electric machine temperature signal $Temp_{EM1}$. The controller 146 may also be configured to receive input signals 204 from the starter electric machine such as the starter electric machine torque signal $\tau_{EM2}$, a traction electric machine speed signal $\omega_{EM2}$, and a traction electric machine temperature signal $Temp_{EM1}$. The controller 146 is further configured to receive input signals 206 indicative of operating conditions of each of the high-voltage battery and low-voltage battery respectively, such as battery voltages $V_{b1}$ and $V_{b2}$, current $I_{b1}$ and $I_{b2}$, state of charge $SOC_{b1}$ and $SOC_{b2}$, and battery temperature $Temp_{b1}$ and $Temp_{b2}$. The controller is further configured to receive input signals 208 indicative of various other vehicle operating conditions, such as propulsion system torque demand $\tau_{DEMAND}$, braking demand $Brk_{DEMAND}$, vehicle analytics such as sub-system state of health, external object proximity $E_{Prox}$, global positioning system location GPS, transmission gear state Trans-Gear, as well as the operational state of a plurality of different vehicle devices $STATE_{DEVICE\ 1}$ through $STATE_{DEVICE\ i}$. The controller 146 is further configured to receive input signals $ACC_{DEMAND}$ representative of power load of vehicle accessories. While several example inputs are described herein by way of example, it is contemplated that additional or different combinations of inputs may be suitable to influence operation of the propulsion system.

Based on the various input signals received by the controller, a processor is programmed to execute one or more algorithms to control operation of the propulsion system. An operating system 210 is stored at the controller 146 to monitor and regulate operation of the components of the propulsion system. The operating system 210 may include a propulsion mode selection algorithm 212 to determine and implement the most suitable combination of propulsion sources based on the input conditions. More specifically, the controller monitors the battery, engine and motor systems to determine the best mode of operation at any given time based on the respective current states. In one example, the propulsion system may include at least an engine-only drive mode, a regenerative operation drive mode, an electric-only EV drive mode, and a dual propulsion source HEV mode.

The operating system 210 may also include an algorithm 214 to prepare for the initiation of an auto-start procedure. The controller 146 is programmed to deactivate the engine in response to certain operating conditions with relatively low torque demand. In one example, the engine is deactivated when the vehicle is at rest having substantially zero velocity. The controller may also be programmed to issue a command to deactivate the engine during a coast event where the vehicle decelerates due to its own rolling resistance. Once torque demand is increased to greater than a predetermined threshold, the engine may be automatically restarted to provide propulsion torque. Auto-start is used to restart the engine following a period of deactivation. Algorithm 214 may also include a logic portion to prompt a preparation of the starter electric machine in advance of the auto-start event. For example, the speed of the electric machine may be ramped up to be synchronized with a rotational speed of the engine prior to commanding the starter actuator to engage the starter electric machine. As discussed above, the brushless motor starter electric machine enables a more rapid response during an engine auto-start event. Therefore the engine may be deactivated more frequently during driving without a perceivable reduction in torque performance of the propulsion system.

The operating system 210 may further include an algorithm 216 that includes starter system selection. Based on the operating conditions of the propulsion system, the engine may be restarted from any of multiple sources. For example under most normal operating conditions, the brushless starter motor powered by the high-voltage power source is used to start the engine. Under other conditions, such as a low SOC of the high-voltage power source, the low-voltage power source may be used to power the starter motor. In further examples such as certain fault conditions, rotation present in the driveline may be used to turn the engine for restart in a fault mode. More specifically, one or more of the clutches may be engaged to restart the engine using driveline rotation if other starter sources are unavailable.

The operating system 210 may further include an algorithm 218 for controlling actuation of engagement mechanisms of the starter electric machine. As discussed above, an example mechanism includes a sliding pinion gear within a housing of the starter electric machine and a starter actuator to move the pinion gear between a first disengaged position and a second engaged position. The logic for control of the starter actuator may be included in algorithm 218.

The operating system 210 may further include an algorithm 220 for controlling the hybrid vehicle operating strategy. Certain predeterminations of ideal operation to maximize fuel economy and energy recovery may be made using information known in advance. For example, based on an upcoming route provided by a user, opportunistic recharging timing may be planned in advance such that the controller may forecast certain occurrence of engine on/off states, electric machine on/off states, energy regeneration states, and engine restart events for example.

The operating system 210 may further include an algorithm 222 for managing fault tolerance during operation. As discussed above, the propulsion system 100 often remains operational in spite of degraded function or loss of function of certain individual components. The fault tolerance algorithm 222 ensures that the vehicle will not be stranded due to component degradation and prevents a customer walk-home situation. For example, when a high-voltage battery SOC is below critical level to restart the engine, this algorithm sets the DC-DC converter to a boost mode to supply sufficient charge from the low-voltage battery or provide a 12 volt jump start power source to the high-voltage power source to enable the engine start function. In the engine-running condition, if either the low-voltage battery or the high-voltage battery is disconnected due to a loose contact or other fault, the low-voltage loads can be sustained by operating the traction electric machine 122 in generating mode and supplying the low-voltage loads via the DC-DC converter operated in the buck mode. In another scenario, if there is a fault in the starter 140, the electric machine 122 can be operated as a motor to start the engine by opening clutch 110 and engaging clutch 106. In case the low-voltage battery, which generally powers most of the vehicle controllers, is fully discharged and the vehicle is not responsive to key starts, the fault tolerance algorithm can power the critical controllers using the high-voltage power source via the DC-DC converter so that the vehicle can be started.

Algorithms 212, 214, 216, 218, 220, 222 are each described above as independent features. However, it should be appreciated that certain aspects of the features includes functional overlap and therefore may be combined into more comprehensive overarching algorithms.

With continued reference to FIG. 2, the controller 146 provides several output signals to influence the operation of the propulsion system. A set of clutch control signals 224 is output from the controller to open and/or close any of the plurality of clutches to control the torque flow path through the propulsion system. The various example configurations described in the present disclosure include a number of different clutch positions to influence the torque input to, and torque output from, any of the several propulsion sources. Clutch control signals $C_1$ through $C_i$ represent commands issued to control any of the i number of clutches in the propulsion system. Any of the clutches may be integrated as part of other propulsion system components, such as within a transmission housing or within a torque converter fluid coupling device.

The controller 146 also outputs a set of control signals 226 to actuate any of the plurality of actuators in the propulsion system. Actuator control signals $A_1$ through $A_i$ represent commands issued to control any of the i number of actuators in the propulsion system. Certain of the actuators determine mechanical coupling between the propulsion sources and the drive line. Other of the actuators may control the current flow through the high-voltage and/or low-voltage bus to power components of the propulsion system. Additional electrically-driven actuators of the propulsion system, such as EPS system actuators to change wheel angle, may be operated based on command signals 226 output from the controller 146.

The controller 146 also outputs a set of electric machine commands 228 to operate the individual electric machines. The electric machines may include control logic to receive commands that influence the torque and/or speed of any of the electric machines. Each of the commands may include control of power flow to an individual electric machine. More specifically, such commands may control at least one of a voltage level, a current level, and PWM parameters for electric machine operation. According to an example, the controller 146 provides command signals $EM_{TRACTION}$, $EM_{STARTER}$, and $EM_{ACCESORY}$ to control the traction electric machine 122, the starter electric machine 122, as well as any of a number of potential accessory electric machines discussed in more detail below.

The controller 146 also regulates voltage delivered to low-voltage loads such as vehicle accessories. The controller outputs a control signal $APM_{CTRL}$ to the APM to regulate the voltage level passed from at least one of the high-voltage bus and the low-voltage bus to the low-voltage loads 136.

Figure 3:
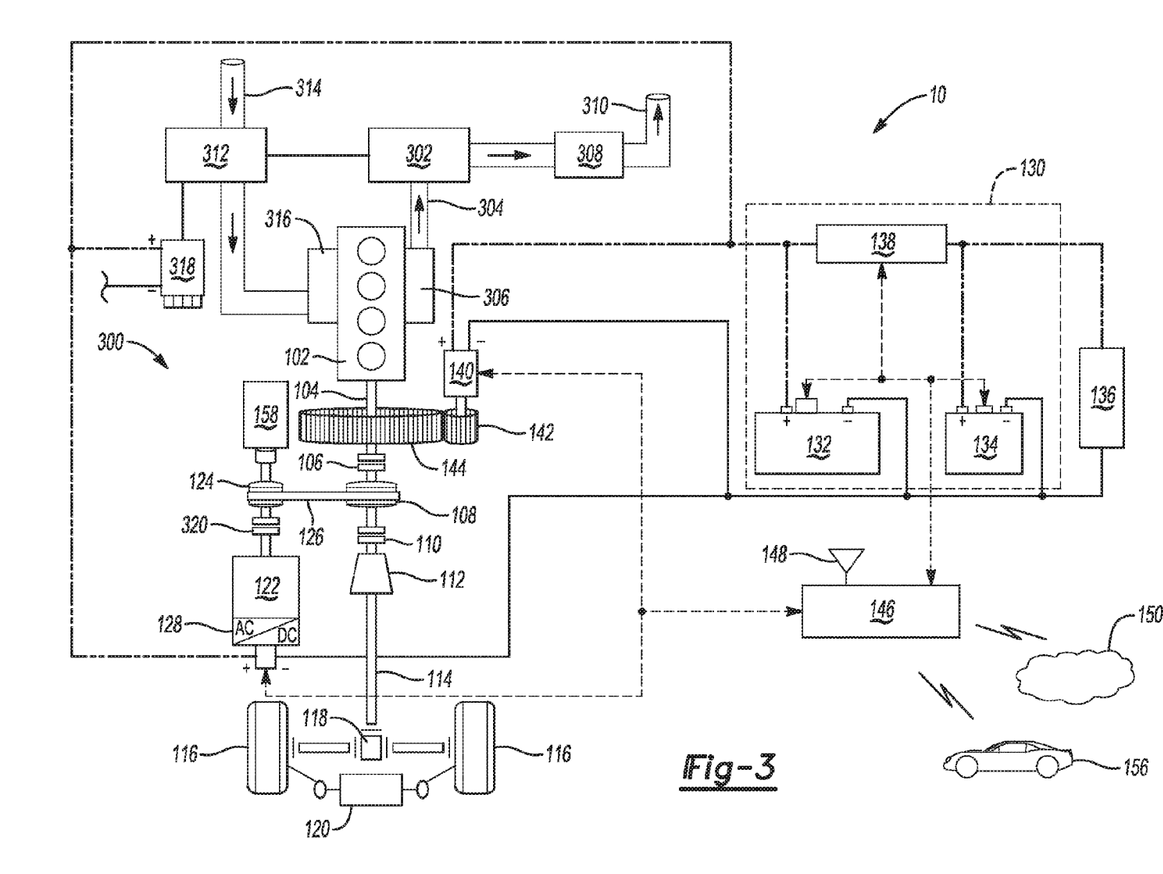
FIG. 3 is a schematic illustration of a first alternate example hybrid propulsion system.

Referring to FIG. 3, an alternate example propulsion system 300 is provided. Common reference numerals are used where components operate in the same fashion as previous examples. The propulsion system 300 includes a waste heat recovery (WHR) sub-system. A turbine 302 is arranged in an exhaust flow path 304 downstream from an exhaust manifold 306 of the engine 102. Exhaust gas flowing from the engine 102 passes through the turbine 302 causing the turbine to spin. The exhaust is then routed through an exhaust aftertreatment system 308 prior to being released from a tail pipe 310. The turbine 302 is coupled to a compressor 312 such that rotation of the turbine also rotates the compressor. An air intake 314 directs fresh air through the compressor 312 to create a pressure rise. The pressurized air is then passed to an intake manifold 316 coupled to the engine 102. An accessory electric machine 318 is coupled to the compressor 312. The accessory electric machine 318 is arranged to provide torque to rotate the compressor 312. A pressure rise may be generated more rapidly as compared to the time required for the turbine to rotate solely due to exhaust gas flow. In this way the electric machine reduces a lag in power buildup of the turbo charger system. The accessory electric machine 318 is also configured to generate power from the compressor rotation once the turbine is fully driven by exhaust flow. The power may be passed to at least one of the high-voltage battery 132 and low-voltage battery 134.

In alternative configurations, the accessory electric machine 318 may be coupled to the turbine 302 of the WHR. In this way, the accessory electric machine 318 may be powered to spin the turbine 302 ahead of exhaust flow build up. Much like the previous example, the electric machine 318 contributes to responsiveness and helps to avoid lag turbocharger output. Once exhaust flow is at full capacity to drive the turbine, the accessory electric machine 318 may be operated as a turbogenerator to recover energy from the rotation of the turbine.

In the example of FIG. 3, the FEAD 158 is driven at a location in the propulsion system 300 that is downstream of the engine 102. In one example, the FEAD 158 is coupled to the motor torque interface 124. Also, a third clutch 320 is provided between the traction electric machine 122 and the motor torque interface 124. The third clutch 320 may also be effective to eliminate drag from the traction electric machine when not operated as a motor or generator. Additionally, decoupling the third clutch 320 may help prevent undesirable back-spinning of the traction electric machine 122. Based on the state of the first clutch 106 and the third clutch 320, the FEAD 158 may be selectably driven by torque output from either the engine 102, the traction electric machine 122, or both. As a result higher electrical load vehicle accessories, such as air conditioning, may be powered by the traction electric machine 122 while the engine 102 is deactivated.

Figure 4:
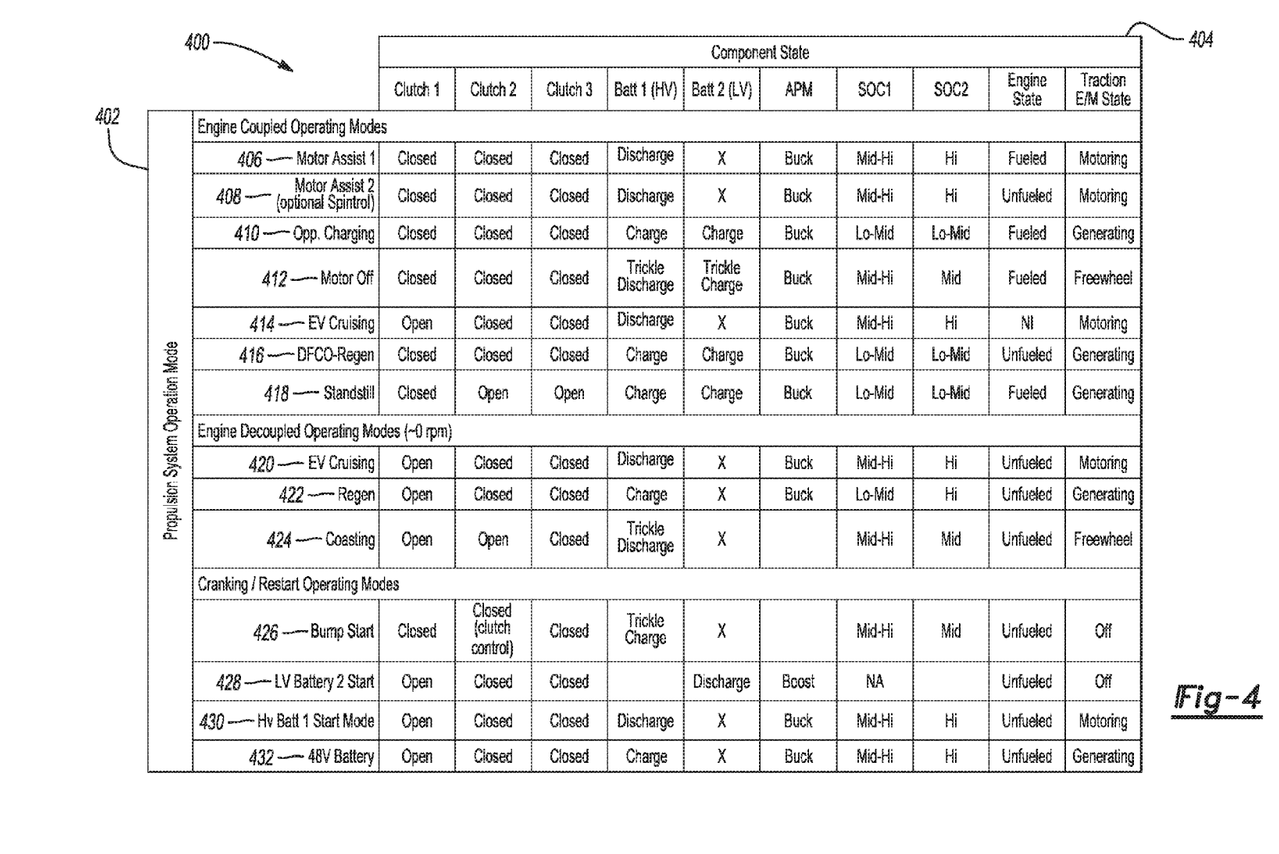
FIG. 4 is a table of operation modes of a hybrid propulsion system.

Referring to FIG. 4, table 400 depicts an example of various operating modes 402 according to aspects of the present disclosure. The propulsion system controller issues commands to control the component state 404 of each of a plurality of system components to cause a particular operating mode of the propulsion system.

In mode 406, a first motor assist mode, both of the engine and the traction electric machine are operated to provide propulsion torque. Each of the first clutch, the second clutch, and the third clutch are closed to transfer torque. The high-voltage battery is operated to discharge power to supply the traction electric machine. The APM is set to operate in buck mode to step down voltage for low voltage accessory loads. The first motor assist mode 406 is operated when the high-voltage battery has a mid to high SOC value. In one example, motor assist is implemented when state of charge is greater than a first SOC threshold. In certain more specific examples, the SOC first threshold is set to about 50%. The first motor assist mode 406 operates both propulsion sources such that fuel is supplied to the engine, and the traction electric machine is operated in motor mode.

Mode 408 is a second motor assist mode which is similar to the first motor assist mode 406, except where the engine is an unfueled state. Since each of the first clutch, the second clutch, and the third clutch are closed to transfer torque, the engine is still turned in the unfueled state. Mode 408 may also include a "spintrol" feature to enhance driving smoothness. The term "spintrol" may refer to using the traction electric machine to maintain the speed of the unfueled engine at a low speed (e.g., idle) to maintain zero lash in the driveline and avoid a clunk upon a driver accelerator pedal input.

Mode 410 represents an opportunistic charge mode where power is provided back to at least one of the high-voltage battery and the low-voltage battery. In cases where a battery SOC value drops to less than a second SOC threshold, the engine is fueled for vehicle propulsion, and the traction electric machine is operated as a generator to recover energy. In one example the second SOC threshold is set to about 40%. In a more specific example, charge is provided to both of the high-voltage battery and the low-voltage battery. It should be appreciated that various SOC thresholds may be employed as appropriate dependent on the materials and design of the high-voltage and the low-voltage batteries or other appropriate energy sources.

Mode 412 represents a motor off mode where a low amount of energy is discharged from the high-voltage battery and provided to charge the low-voltage battery. Mode 412 may be implemented in response to a condition where the high-voltage battery has a mid to high SOC value, and the low-voltage battery has a mid SOC value. The traction electric machine is allowed to freewheel and a trickle charge is discharged from the high-voltage battery and provided to the low-voltage battery.

Mode 414 represents operation of the propulsion system in electric vehicle (EV) mode. The first clutch is opened to decouple torque from the engine. Energy is provided from the high-voltage battery to power the traction electric machine for vehicle propulsion. It may be advantageous to employ EV driving mode under certain cruising or low-speed driving conditions such as providing acceleration from zero vehicle speed. In one example, EV mode is implemented when the vehicle is operated at a relatively steady-state speed determined by motor and high-voltage battery speed and power limits, respectively. In another example, EV mode is implemented when the vehicle is operated within a certain speed and acceleration envelope as commanded by controller 146, which determines that the motor and high-voltage battery can provide the necessary performance. In a further example, EV mode 414 may be engaged to propel the vehicle from zero speed up to a power-limited rate of acceleration and/or speed before or after and engine restart.

Mode 416 represents a deceleration fuel cut-off (DFCO) mode where the controller causes fuel supply to the engine to be shut off when the vehicle is decelerating or slowing down. Additionally, regeneration may be performed to recover energy while the engine is unfueled. During fuel cut-off, the engine may remain coupled to the driveline and continue rotating while unfueled. In one example, the controller is programmed to cause fuel cut-off in response to vehicle deceleration greater than a first deceleration threshold that persists for longer than a second predetermined time duration. The traction electric machine is operated in generator mode to supply energy to at least one of the low-voltage battery and the high-voltage battery. The controller may cause energy to be routed to one or both of the batteries depending on the SOC value of each respective battery. For example, in DFCO mode 416 energy is provided to a battery in response to low to mid SOC value. In cases where a battery SOC value is less than the second SOC threshold during deceleration conditions, the traction electric machine is operated as a generator to recover energy.

Mode 418 represents a vehicle standstill mode where vehicle speed is substantially zero. If the SOC value at least one of the low-voltage battery and the high-voltage battery is less than the second SOC threshold while the vehicle is at rest, the controller is programmed to operate the engine and operate the traction electric machine in generator mode. The first clutch is closed to transfer torque, and the second clutch and third clutch are opened to decouple torque from the driveline. The engine is fueled to output torque and in turn spin the traction electric machine to generate energy. Power is passed to one or both of the batteries as required based on each respective SOC value.

Mode 420 represents an EV cruising mode where the engine is decoupled and unfueled. If the SOC value of the high-voltage battery is mid to high (i.e., greater than the first SOC threshold), power is discharged from the battery to operate the traction electric machine in motor mode. The first clutch is opened to decouple the engine from the driveline, and the second clutch and the third clutch are closed to transfer torque from the motor to the vehicle wheels.

Mode 422 represents a regeneration mode where the engine is decoupled. When the vehicle undergoes deceleration, torque from the road wheels may be applied to operate the traction electric machine in generator mode. When the SOC value of the high-voltage battery is low to mid (i.e., less than the second SOC threshold), energy is provided to the battery. The first clutch is opened to decouple the engine from the driveline, and the second clutch and the third clutch are closed to transfer torque from the vehicle wheels to the generator. Energy is then passed to the high-voltage battery to restore charge.

Mode 424 represents a coasting mode where the engine is decoupled and the high-voltage battery stored sufficient charge so as not to require recharging. In one example, coasting mode 424 is entered when decelerating while the SOC value of the high-voltage battery is greater than the second SOC threshold. The traction electric machine is allowed to freewheel. The first clutch and the second clutch are each opened to decouple torque from the road wheels from the traction electric machine. The second clutch is closed to allow the motor to provide torque on demand for propulsion or operation of the FEAD for example.

Mode 426 represents a "bump start" mode where a clutch-assisted engine restart may be used at high vehicle speed or high kinetic energy. Rotation already present in the driveline may be used to turn the engine for a restart event. The engine is restarted by closing one or more of the clutches in the driveline. Bump start may be useful during conditions where other starting sources are unavailable and the vehicle is already rolling.

Mode 428 represents an engine start mode using the low-voltage battery as the energy source. As discussed above, such a condition may exist if there is a fault occurrence at the high-voltage battery. The first clutch is opened to decouple the engine from the downstream portions of the driveline. Power is discharged from the low-voltage battery to operate the starter electric machine to crank the engine. The response time of the starter electric machine may be degraded as compared to a high-voltage start, however the starting function is still enabled when powered from the low-voltage power source.

Mode 430 represents an engine start mode using the high-voltage battery as the energy source. The first clutch is opened to decouple the engine from the downstream portions of the driveline. Power is discharged from the high-voltage battery to operate the starter electric machine to crank the engine. This is the preferred mode of engine starting and restarting since the starter electric machine provides a better response to the high-voltage power input. The high-voltage engine start may be used to provide a rapid restart, such as following an EV cruising mode for example. According to some examples, the controller is programmed to synchronize a rotational speed of the engine with the input speed of the transmission following an engine restart and prior to mechanically engaging the engine (e.g., engaging one or more of the disconnect clutches).

Mode 432 is similar to regen mode 422, but in this case the traction electric machine is used to generate power which is shunted directly to drive the high-voltage starter electric machine. The power is provided to bypass the high-voltage battery.

Figure 5:
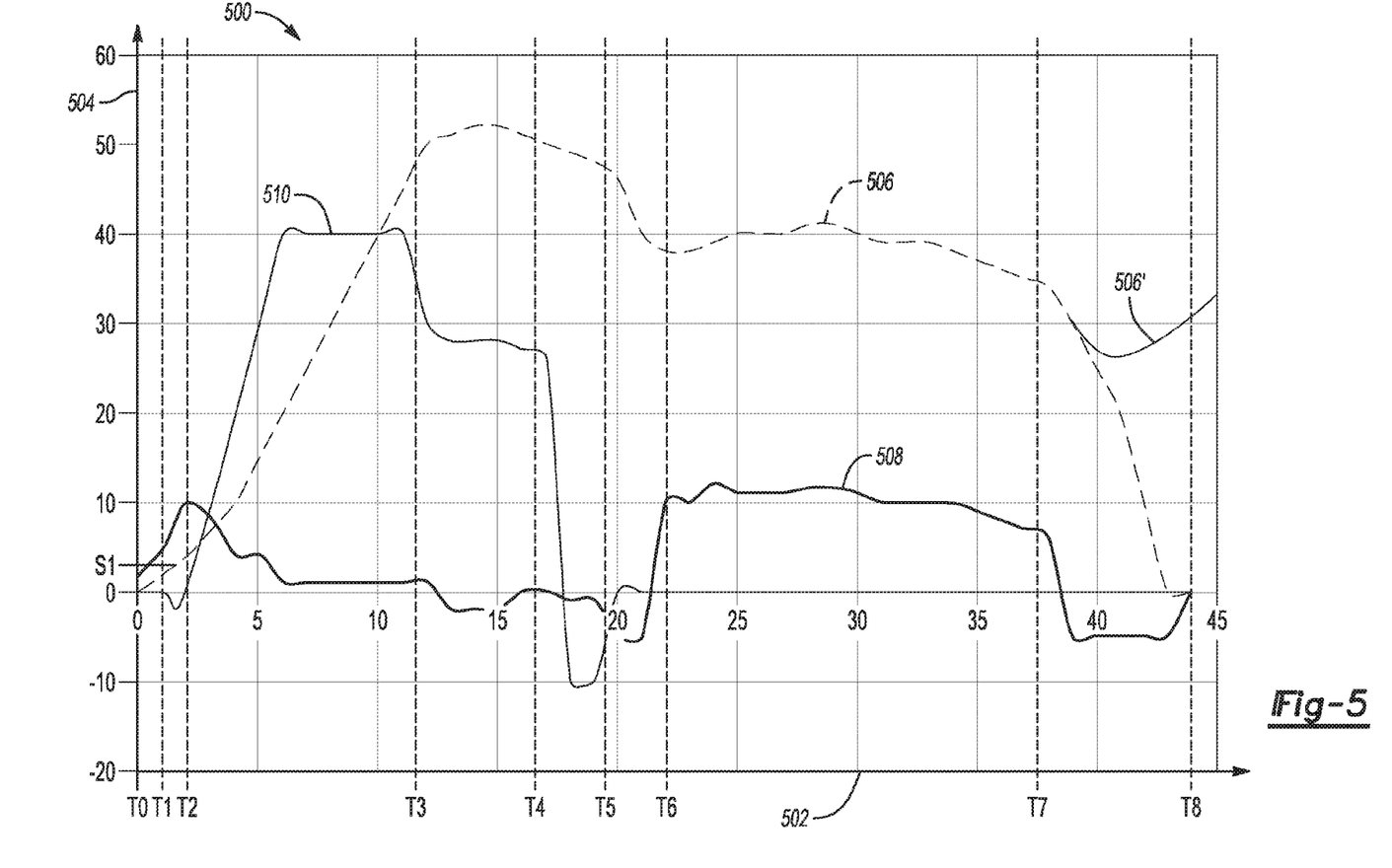
FIG. 5 is a time plot of various operation modes of a hybrid propulsion system.

Referring to FIG. 5, plot 500 depicts an example mode selection profile according to the example mode selection scheme discussed above. Horizontal axis 502 represents time as the vehicle travels a route. The vertical axis 504 represents a magnitude of power output of a propulsion source for battery output power curve 508 and engine output power curve 510, and represents vehicle velocity for the velocity curve 506.

At time T0 the vehicle is accelerated from rest. The vehicle is initially launched using EV mode for propulsion. If sufficient acceleration demand is present, the controller may be prompted to start the engine to supplement propulsion torque. In an alternative example, speed is used as a criteria to trigger an engine start event. In a more specific case, the propulsion system triggers an engine start event in response to a vehicle speed exceeding a first speed threshold S1. In some examples, S1 is set to be about 4 kilometers per hour. Between T1 and T2, the engine is started, as denoted along curve 510 by a brief duration of negative engine torque related to torque input to crank the engine.

From time T2 to T3 the engine is operated in an engine assist mode to supplement overall torque output of the propulsion system. Once engine output power approaches full capacity, motor torque output may be reduced as the vehicle continues to accelerate.

During the time between T3 and T4, the vehicle may approach a maximum speed during the drive cycle and cease acceleration. During time of no acceleration, the propulsion system may enter an opportunistic charge mode to take advantage of available energy in the system. As depicted by curve 510, engine output is reduced. As further shown by curve 508 energy (shown as negative output energy on the plot) is returned to the traction electric machine.

During the time between T4 and T5, the propulsion system may enter a DFCO mode in response to further vehicle deceleration. The engine output is further reduced in response to the fuel cutoff. Curve 510 reflects negative energy related to engine drag applied to further decelerate the vehicle.

During the time between T5 and T6, the propulsion system may inter EV regeneration in response to an increased deceleration demand that is greater than a predetermined deceleration demand threshold. As discussed above, EV generation mode allows the traction electric machine to be operated in generator mode such that the high-voltage battery is recharged. Curve 508 reflects energy being returned to the battery. In the example provided, power is passed to the battery at a peak rate of about 5 kW.

During the time between T6 and T7, the vehicle is driven at about a steady-state speed for an extended duration. The propulsion system enters an EV cruise mode in response to the relatively consistent speed. The engine is disabled to conserve fuel, and power is output from the traction electric machine while operated in motor mode. In the example provided, about 10 kW is output from the electric motor, corresponding to a vehicle speed of about 40+/−2.5 kilometers per hour. Configuring the starter electric machine to be powered by the high-voltage battery allows rapid engine restarting at the conclusion of both of EV cruise modes and EV regeneration modes. While not depicted in plot 500, high acceleration demand while operating in an EV mode may cause an engine restart event.

During the time between T7 and T8, the vehicle is brought to rest from the cruising speed. The propulsion system enters a second regeneration mode to recover energy from the deceleration. The engine remains disabled, and the traction electric machine is operated as a generator. As may be seen from the plot, the recharge rate of about 5 kW is maintained for a longer duration as compared to the previous EV regeneration described above during the time between T5 and T6. Thus, more overall energy is recovered during the extended deceleration period.

As reflected by alternate curve 506' a sudden acceleration could be effected due to a driver "change-of-mind" during a drive cycle, realized by a sudden tip-in at the accelerator pedal. This condition may or may not be preceded by a braking event. The change-of-mind case could occur during any phase of the driving modes described above. In such cases, the traction electric machine delivers instantaneous torque per driver request. The engine, if disconnected from the powertrain, is restarted and re-engaged with the driveline to provide additional torque. The torque sharing between the motor and the engine is determined by the driver pedal requirements.

Figure 6:
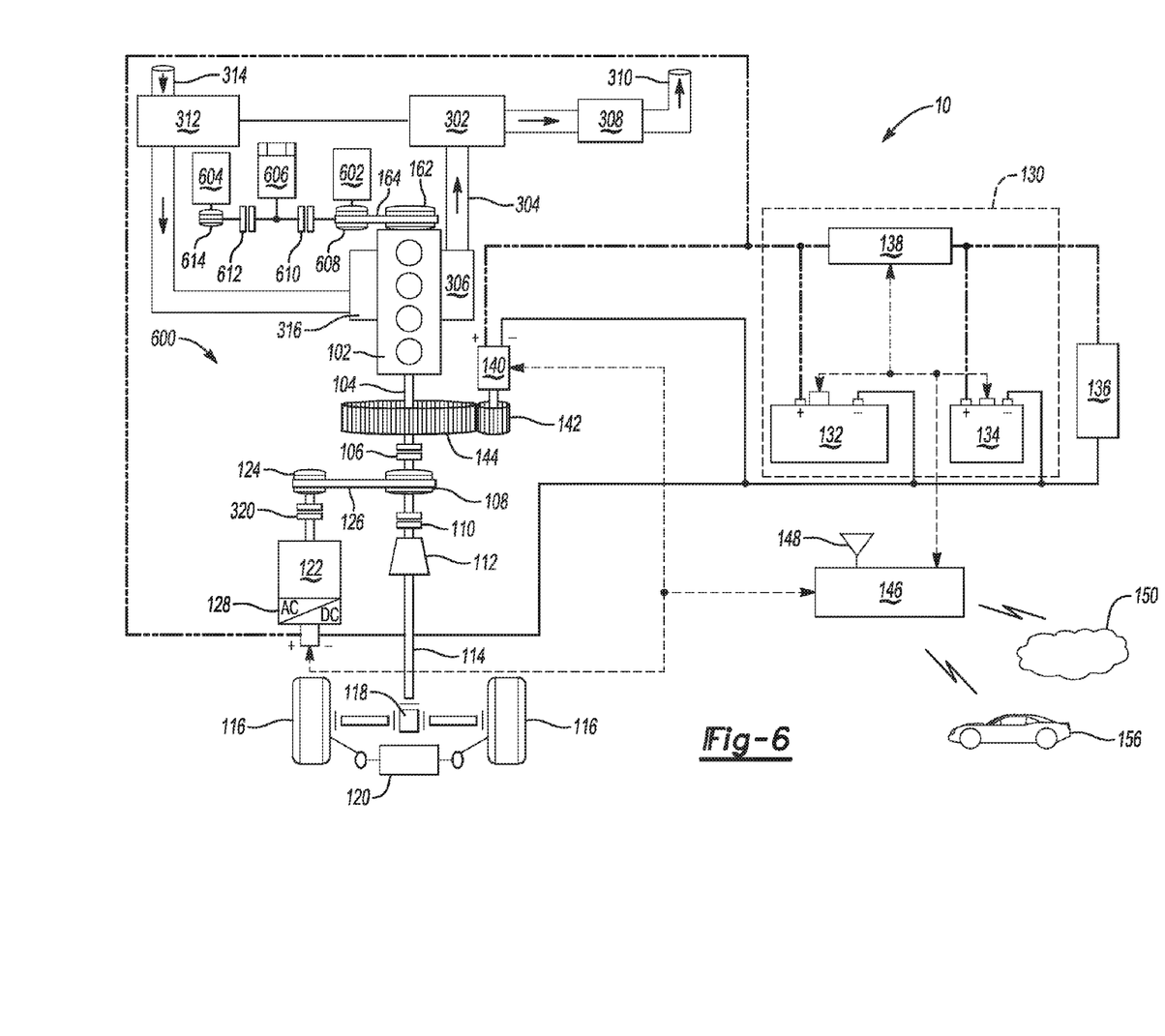
FIG. 6 is a schematic illustration of a second alternate example hybrid propulsion system.

Referring to FIG. 6, vehicle 10 is provided with an alternative configuration propulsion system 600. In the alternate configuration, an accessory electric machine 606 is applied to operate certain vehicle accessories. The accessory electric machine may be operated in motor mode or generator mode. In the example propulsion system 600, each of an air conditioning unit 602 and a water pump 604 may be selectably driven by the accessory electric machine 606. The accessory electric machine 606 may be operated to provide fault tolerance and drive the accessories in response to a fault condition such as a battery failure. The accessory electric machine 606 may be powered by either the low-voltage battery 134 or the high-voltage battery 132. The air conditioning unit 602 includes an A/C torque interface 608. A belt 164 couples the A/C torque interface 608 to the engine output torque interface 162. Under normal operating conditions, the engine 102 drives the accessories. In this case, the accessory electric machine 606 may be operated as a generator to recover energy from rotational output of the engine 102. In this case the accessory electric machine 606 may replace the function of an alternator and pass energy to the low-voltage battery 134 to maintain a full charge. A propulsion system alternator may be replaced by the accessory electric machine 606.

The A/C torque interface 608 is also coupled to a water pump torque interface 614. One or more clutches may be disposed between the air conditioning unit 602 and the water pump 604 to enable independent operation of each of the accessories. A first accessory clutch 610 is disposed between the air conditioning unit 602 and the accessory electric machine 606. A second accessory clutch 612 is disposed between the accessory electric machine 606 and the water pump 604. In response to a fault condition associated with one of the batteries, the accessory electric machine may be driven by the non-fault battery to operate the accessories in a limp mode.

In variant configurations of the propulsion system 600, at least one of the accessories may be solely electrically-driven without mechanical coupling to the engine output. In one example, an electric water pump may be directly powered by the high-voltage battery 132.

Figure 7:
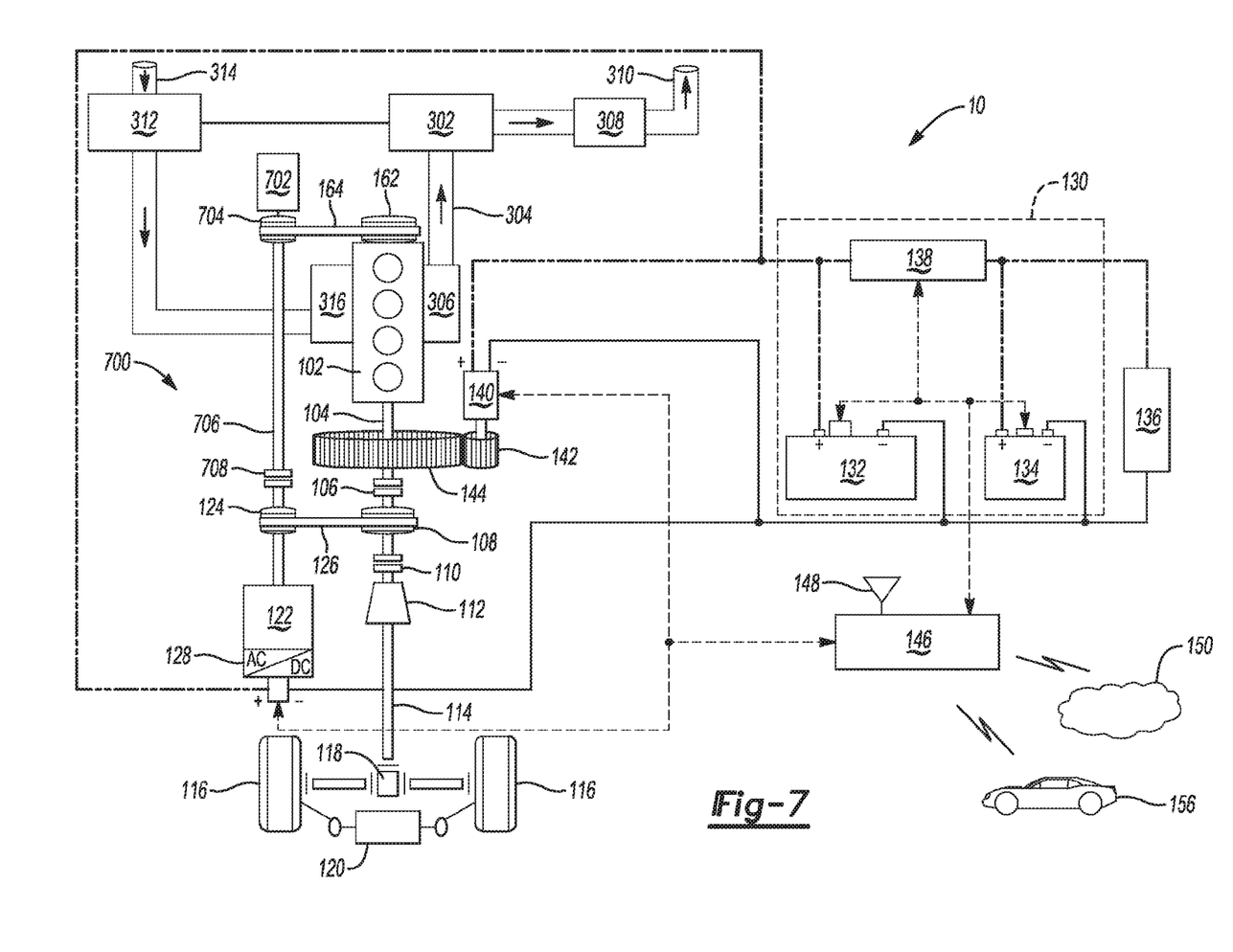
FIG. 7 is a schematic illustration of a third alternate example hybrid propulsion system.

Referring to FIG. 7, vehicle 10 is provided with a further alternative configuration propulsion system 700. The traction electric machine 122 may be arranged to directly drive an accessory unit 702. In one example, the accessory unit 702 is a heating, ventilation, and air conditioning (HVAC) unit. An accessory torque interface 704 is coupled to the motor torque interface 124. A shaft 706 transfers torque between the accessory unit 702 and the traction electric machine 122. A clutch 708 is disposed between the accessory unit 702 and the traction electric machine 122 to selectably decouple a torque connection. The accessory torque interface 704 is also coupled to the engine output torque interface 162. In one example, a belt 164 connects the torque interface 704 to the engine output torque interface 162. The configuration allows the accessory unit 702 to be selectively driven by either the engine 102 or traction electric machine 122. In effect, the HVAC unit 702 may be powered by the high-voltage battery 132 for light load conditions when there is sufficient SOC. In one example "light load" may refer to overall electrical loads of less than about 2 kilowatts. Practically, the configuration of FIG. 7 allows the propulsion system to remain in EV mode with the engine 102 deactivated in spite of slight changes in electrical demand. Such electrical demand may otherwise cause the engine to unnecessarily restart to provide power assist.

The electrified hybrid vehicle configurations described herein allow for certain low-speed EV mode special operation cases. Since the traction electric machine may be directly connected to the driveline with the engine decoupled, drag due to turning the engine can be eliminated. In one example, an autonomous self-parking mode is enabled at low speed using an EV drive mode. The controller may communicate over a wireless network to receive real-time mapping or other guidance to park the vehicle. In some examples the vehicle receives information from external local infrastructure devices indicative of available parking spaces. Additionally, optical cameras or other sensors on the vehicle may sense the surrounding areas to steer the vehicle. At least on proximity signal is generated by the sensors that is indicative of objects in a vicinity of the vehicle. In this case, the engine can remain in a disabled state while the vehicle is automatically parked.

The starter electric motor operates as a failsafe feature during autonomous self-parking mode. If the SOC of the high-voltage power source becomes less than a predetermined SOC threshold during self-parking, the starter electric machine is powered to restart the engine to ensure the presence of an adequate propulsion source in order to complete the self-parking maneuver. For example, a self-parking event in a large parking lot or parking structure may cause a drop in battery SOC such that the engine may be required to provide power to complete the maneuver.

In a specific application, smart cameras located at a parking lot transmit information to the vehicle regarding available parking spaces. A user may visually review the available spaces via a user interface display in the vehicle, then select one of the available parking spaces as a target parking space. In one example, the vehicle operates in a valet mode such that a user can drive to a doorstep area of a desired location, then select a nearby target parking space from the group of available parking spaces. The user may then exit the vehicle, and prompt the vehicle to automatically self-park at the user-selected target parking space while operating in low speed EV mode. The vehicle then uses information wirelessly received from local infrastructure devices, GPS positioning data, as well as data detected by vehicle sensors to autonomously propel the vehicle using the traction electric machine toward the target parking space to self-park in the space.

In a further example, the vehicle while operating in low-speed EV self-park mode, may be configured to navigate itself though a parking lot or structure, and search for an empty parking spaces suitable to store the vehicle. Visual sensors at the vehicle may output signals indicative of object detection in an area near the vehicle. Vehicle communication with local infrastructure may provide information regarding available spaces, other vehicles traversing the parking area, as well as other information to facilitate self-parking. In this way, the vehicle may be equipped to park itself without requiring a user selection of a target parking space.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a vehicle propulsion system for a vehicle having a controller, the method comprising:
   selectively operating an engine and a first electric machine each configured to provide torque to propel the vehicle;
   coupling a second electric machine to the engine to provide torque to start the engine from an inactive state;
   powering both of the first electric machine and the second electric machine with a high-voltage power source over a high-voltage bus;
   positioning a plurality of torque disconnect clutches along a torque flow path to selectively decouple at least one of the engine and the first electric machine according to a vehicle drive mode;
   operating a turbocharging system, including a turbine and a compressor driven by an engine exhaust;
   powering a third electric machine with the high-voltage power source and coupling the third electric machine to at least one of the compressor and the turbine to drive the turbocharging system in advance of a flow of the engine exhaust being at a full capacity;
   selecting a first drive mode causing a decoupling of the engine in response to the vehicle being driven at a steady-state speed for a predetermined duration of time;
   deactivating the engine and propelling the vehicle using the first electric machine; and restarting the engine using the second electric machine powered by the high-voltage power source, via the controller.

2. The method of claim 1, further comprising:
operating a multi-ratio transmission, wherein the first electric machine is off-axis relative to a driveline axis and mechanically coupled to the multi-ratio transmission by a belt drive system.

3. The method of claim 1, further comprising:
operating a differential to distribute torque between vehicle road wheels, wherein the first electric machine is configured to output torque to the differential to propel the vehicle.

4. The method of claim 1, further comprising:
selecting one of a plurality of drive modes based on at least one of a vehicle speed, a torque demand, a SOC of the high-voltage power source, and a SOC of a low-voltage power source.

5. The method of claim 1, further comprising:
integrating at least one of the plurality of torque disconnect clutches as a lockup portion of a fluid coupling torque converter.

6. The method of claim 1, further comprising:
operating a vehicle HVAC system using the high-voltage power source while the engine is in an inactive state.

7. The method of claim 1, further comprising:
synchronizing a rotational speed of the engine with the first electric machine following an engine restart and prior to mechanically engaging the engine to propel the vehicle.

8. A hybrid vehicle propulsion system comprising:
an engine and a first electric machine each configured to selectively provide torque to propel the vehicle;
a second electric machine coupled to the engine to provide torque to start the engine from an inactive state;
a high-voltage power source to power both of the first electric machine and the second electric machine over a high-voltage bus;
a plurality of torque disconnect clutches located along a torque flow path to selectively decouple at least one of the engine and the first electric machine according to a vehicle drive mode;
a turbocharging system including a turbine and a compressor driven by an engine exhaust;
a third electric machine powered by the high-voltage power source and coupled to at least one of the compressor and the turbine to drive the turbocharging system in advance of a flow of the engine exhaust being at a full capacity; and
a controller programmed to:
select a first drive mode causing a decoupling of the engine in response to the vehicle being driven at a steady-state speed for a predetermined duration of time;
deactivate the engine and propel the vehicle using the first electric machine; and
restart the engine using the second electric machine powered by the high-voltage power source.

9. The hybrid vehicle propulsion system of claim 8, further comprising:
a multi-ratio transmission, wherein the first electric machine is off-axis relative to a driveline axis and mechanically coupled to the multi-ratio transmission by a belt drive system.

10. The hybrid vehicle propulsion system of claim 8, further comprising:
a differential to distribute torque between vehicle road wheels wherein the first electric machine is configured to output torque to the differential to propel the vehicle.

11. The hybrid vehicle propulsion system of claim 8, wherein the controller is further programmed to select one of a plurality of drive modes based on at least one of a vehicle speed, a torque demand, a SOC of the high-voltage power source, and a SOC of a low-voltage power source.

12. The hybrid vehicle propulsion system of claim 8, wherein at least one of the plurality of torque disconnect clutches is integrated as a lockup portion of a fluid coupling torque converter.

13. The hybrid vehicle propulsion system of claim 8, wherein the controller is further programmed to operate a vehicle HVAC system using the high-voltage power source while the engine is in an inactive state.

14. The hybrid vehicle propulsion system of claim 8, wherein the controller is further programmed to synchronize a rotational speed of the engine with the first electric machine following an engine restart and prior to mechanically engaging the engine to propel the vehicle.

\* \* \* \* \*